United States Patent
Knapp

[11] Patent Number: 5,804,432
[45] Date of Patent: Sep. 8, 1998

[54] METHOD AND APPARATUS FOR TREATING CONTAMINATED WATER

[76] Inventor: Doug Knapp, 52235 Dorchester Ct., Granger, Ind. 46530

[21] Appl. No.: 340,484

[22] Filed: Nov. 14, 1994

Related U.S. Application Data

[63] Continuation of Ser. No. 900,437, Jun. 18, 1992, abandoned.

[51] Int. Cl.$^6$ ............................................. C12N 5/00
[52] U.S. Cl. ................. 435/243; 435/266; 435/262.5; 435/264; 435/297.1
[58] Field of Search ............................ 435/240.1, 243, 435/260, 262, 262.5, 264, 294.1, 297.1

[56] References Cited

U.S. PATENT DOCUMENTS

| | | | |
|---|---|---|---|
| Re. 27,721 | 8/1973 | Klock ........................................ | 210/617 |
| 2,388,795 | 11/1945 | Montgomery et al. ................. | 210/617 |
| 3,126,333 | 3/1964 | Williams ................................. | 210/617 |
| 3,966,608 | 6/1976 | Mason et al. ........................... | 210/151 |
| 4,192,740 | 3/1980 | Sasard et al. ........................... | 210/614 |
| 4,604,197 | 8/1986 | Lonbontri et al. ...................... | 210/150 |
| 4,800,021 | 1/1989 | Desbos .................................... | 210/150 |
| 4,925,552 | 5/1990 | Bateson .................................. | 210/617 |
| 4,931,183 | 6/1990 | Klein et al. ............................. | 210/617 |
| 4,940,546 | 7/1990 | Vogelpohl et al. ..................... | 210/617 |
| 5,013,442 | 5/1991 | Davis ...................................... | 210/614 |

*Primary Examiner*—David A. Redding
*Attorney, Agent, or Firm*—Evenson, McKeown, Edwards & Lenahan, P.L.L.C.

[57] ABSTRACT

A method and apparatus for treating contaminated water which includes a bioreactor containing contaminant eating bacteria. The contaminated water is introduced into the lower portion of the bioreactor at a predetermined rate. The upper portion of the bioreactor includes media packing which provides surface area for the bacteria. As the contaminated water travels upwardly in the reactor, the bacteria consume the contaminants. Additional bioreactors may be connected in series to the first bioreactor as necessary.

15 Claims, 2 Drawing Sheets

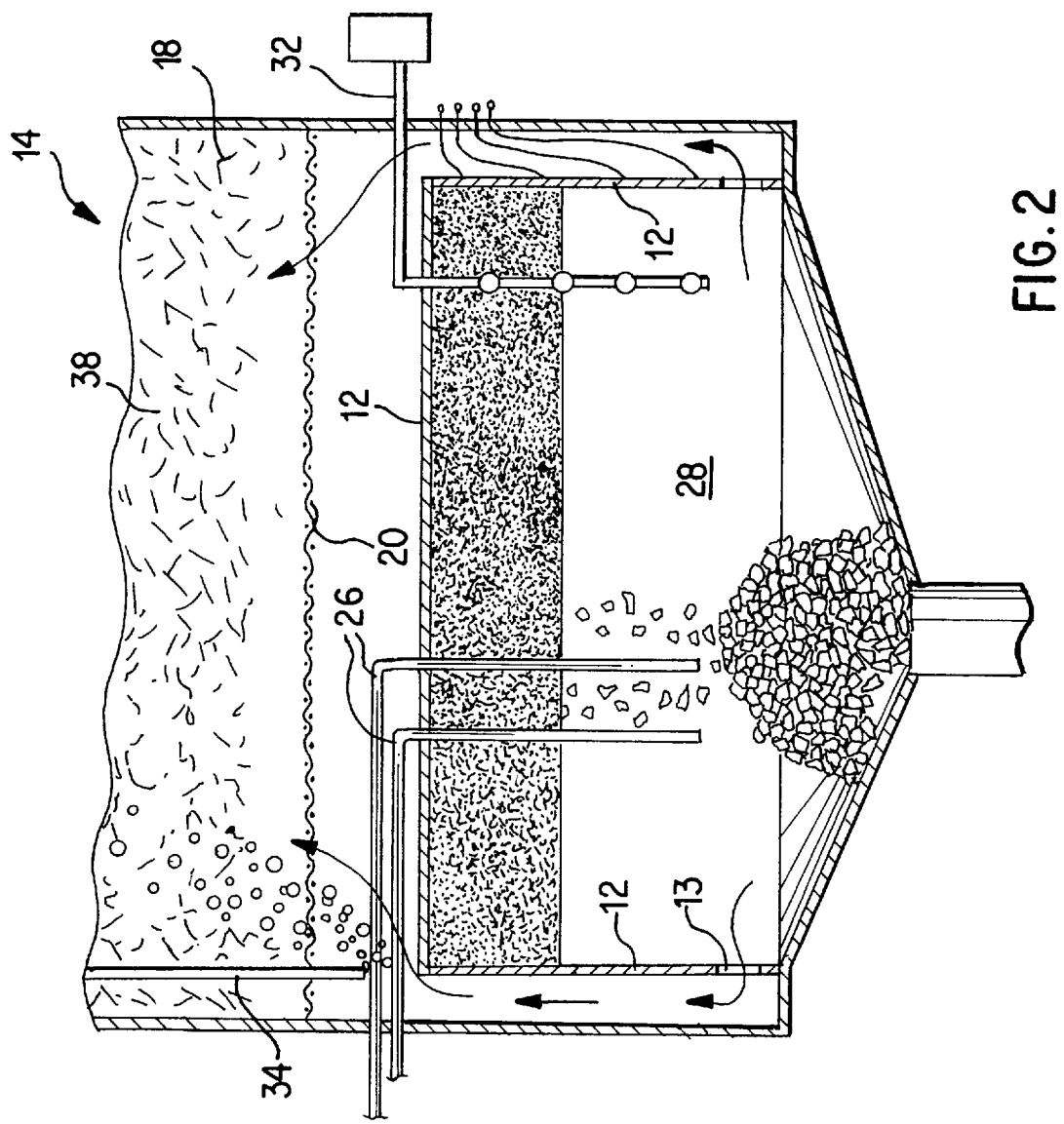

METHOD AND APPARATUS FOR TREATING CONTAMINATED WATER

This application is a continuation of application Ser. No. 07/900,437, filed on Jun. 18, 1992 abandoned.

FIELD OF THE INVENTION

This invention relates to treatment apparatus for contaminated water and will have application to a method of bioremediation of petroleum and other common contaminants.

BACKGROUND OF THE INVENTION

Bioremediation of petroleum contaminated water is a relatively new concept which has gained popularity during the past few years. Through the efforts of Alpha Environmental Corp. of Austin, Tex., and other firms, bacteria have been developed which successfully degrade petroleum products such as oil and gasoline.

The bacteria have thus far been used primarily to bioremediate oil spills on the open sea. Closed systems which utilize microbial bacteria to downgrade volatile organic contaminants (VOC's) on smaller scales have also been developed of late. In all of the closed systems known at this time, contaminated water is pumped into the top of a bioreactor and flows downwardly across culture media which carry the bacteria.

SUMMARY OF THE INVENTION

This invention provides for a bioremedial treatment apparatus which significantly reduces the fire and explosion hazards inherent in current bioreactor technology while providing a consistent and constant "food source" for the bacteria. The bioreactor of this invention provides for introduction of the free contaminant at the sealed lower portion of the chamber. The culture media are housed in the upper portion of the bioreactor and are separate from the lower secondary chamber.

As the contaminated water flows into the bioreactor, it moves upwardly through the culture media. The bacteria act to degrade the oil or gasoline in the water before it reaches the uppermost portion of the bioreactor. In this invention, no free petroleum reaches the uppermost portion of the bioreactor, which is the main cause of fires or explosions in these systems.

The reactor of this invention may also be equipped with inlets to introduce oxygen and nutrients into the chambers to facilitate growth and stability of the bacteria. Analytical testing equipment may also be associated with the apparatus to ensure its operable functionality.

Finally, the apparatus may include one or more secondary bioreactors connected in series to the main bioreactor. The number of secondary bioreactors needed for a given apparatus will normally be determined by the contaminant concentration. Each secondary bioreactor operates by gravity flow and includes multiple chambers which house culture media which act to further degrade petroleum products and other contaminants from water as it passes through the system.

Accordingly, it is an object of this invention to provide an improved treatment apparatus for bioremediation of contaminated water.

Another object is to provide for a bioremediation apparatus which operates on gravity flow principles.

Another object is to provide for a bioremediation apparatus which reduces risks of fire and explosion.

Another object is to provide for a bioremediation apparatus which efficiently and economically degrades petroleum and other wastes from water.

Other objects will become apparent upon a reading of the following description.

BRIEF DESCRIPTION OF THE DRAWINGS

A preferred embodiment of the apparatus has been depicted to illustrate the principles of the invention wherein:

FIG. 2 is a fragmented detail view of the primary bioreactor illustrating the contaminated water introduction chamber.

DESCRIPTION OF THE PREFERRED EMBODIMENT

Figure 1:
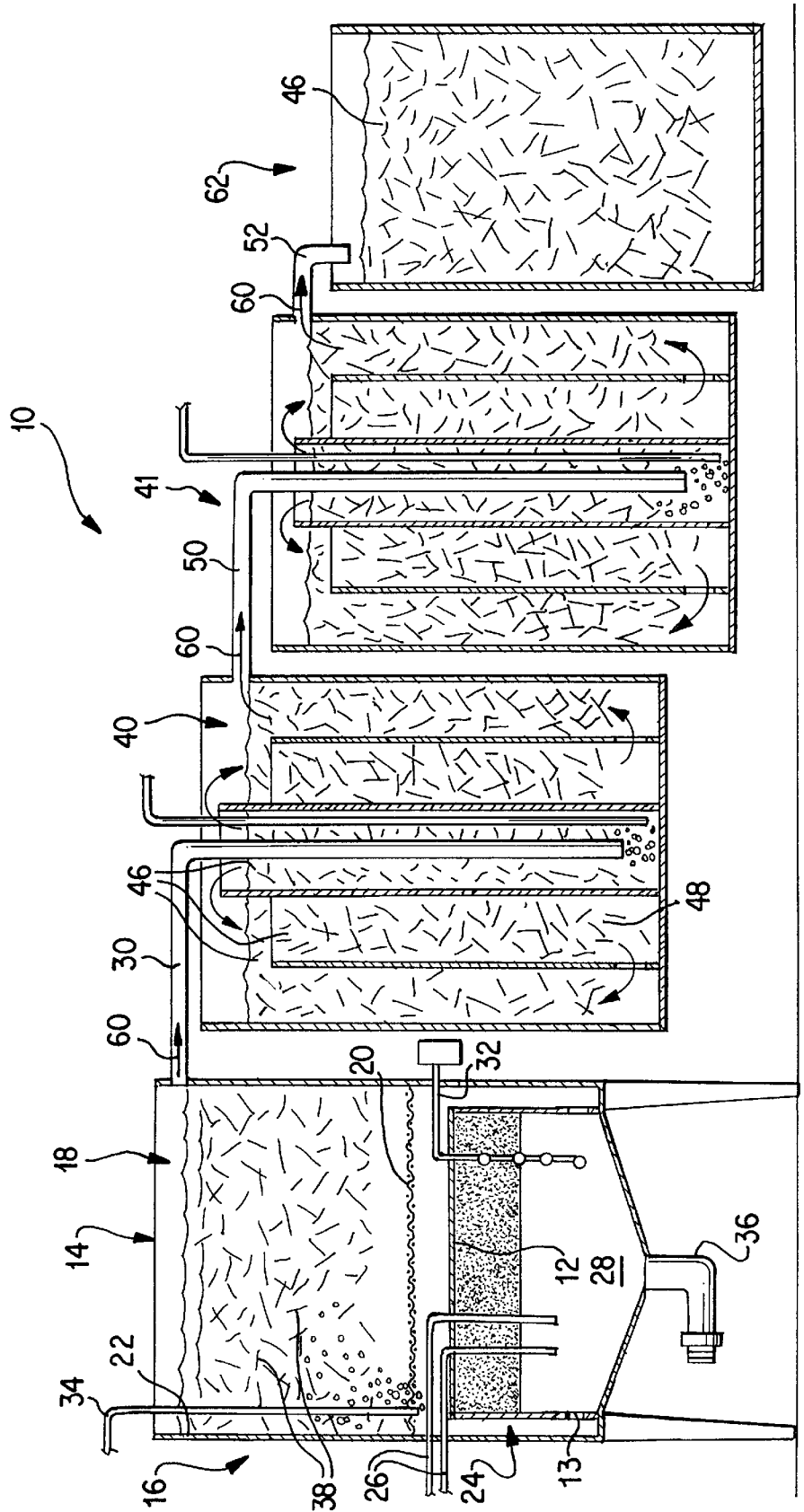
FIG. 1 is a sectional view of the apparatus.

The preferred embodiment herein described is not intended to be exhaustive or to limit the invention to the precise form disclosed. It is chosen and described to illustrate the principles of the invention and its application and practical use to enable others skilled in the art to follow its teachings.

Referring now to the drawings, reference numeral 10 generally designates the bioremedial treatment apparatus of this invention. Apparatus 10 is used to decontaminate water or other fluids which have been contaminated with petroleum products, VOC's or other classified hazardous chemicals.

Apparatus 10 operates to decontaminate water by the known process commonly referred to as bioremediation. In the process, active bacteria are introduced into the contaminated water and serve to break down the complex hydrocarbons which make up the chemical composition of most contaminants. The byproducts of this process are normally active bacteria, carbon dioxide and water, along with some secondary non-hazardous compounds in the event that complex VOC's are treated.

The major focus of this specification deals with the performance of apparatus 10 on petroleum-based contaminants, mainly gasoline and associated fuels, for this example. One foreseeable use of apparatus 10 is in the treatment of water in the vicinity of underground storage tanks and gasoline disposal tanks found in service stations or industrial facilities. Apparatus 10 is designed to receive contaminated water by natural gravity flow action or by pumping, then to expose the water to petroleum "eating" bacteria in the presence of oxygen, which convert the hydrocarbon molecules to carbon dioxide and water.

Apparatus 10 as shown includes a primary bioreactor 14 which consists of a tank 16 of suitable size based upon job requirements. Tank 16 typically has about 4000 gallon capacity, but in theory can be any size, depending upon the nature of the job. Tank 16 defines a separation chamber 28 which houses most of the operative components of apparatus 10.

Bioreactor 14 includes one or more baffle plates or diffusion screens 20 (one shown) secured inside the tank 16, as shown to divide the tank's chamber 18 into an upper primary reaction chamber 22 and a lower collection chamber 24, in which the separation chamber 28 is located. Baffles 20 are constructed so as to allow fluid flow communication between chambers 22, 24.

One or more inlets 26 (two shown) extend from outside of tank 16 and terminate inside lower separation chamber 28. Separation chamber 28 is isolated from chambers 22, 24 by impervious walls 12. Flow outlet 13 allows a predetermined amount of a food source consisting of an mixture of free contaminant and the contaminated water to continuously flow from the separation chamber 28 to the upper primary reaction chamber 22. Outlet 30 is located near the top edge of tank 16 and directs fluids out of the tank. Tank 16 may also include inlets 32, 34 for introduction of microbial nutrient chemicals and oxygen, respectively. Diffusion screen or baffles 20 may be placed over the terminals of inlet 34 as shown to ensure uniform, widespread transmission of oxygen throughout tank 16. A drain 36 positioned at the bottom of tank 16 allows for removal of accumulated solids.

Upper primary reaction chamber 22 is packed with culture media 38. Media 38 can be of any acceptable configurations and construction, and is designed to provide maximum surface area to support growth of bacteria and to allow diffusion of oxygen into the fluid filling upper primary reaction chamber 22. The media 38 illustrated is of polyethylene construction and is of an open mesh configuration. In a typical 4000 gallon bioreactor 14, media 38 will provide approximately 70,000 square feet of surface area for supporting bacteria growth.

Reference numerals 40 and 41 refer generally to secondary bioreactors shown connected in series to primary bioreactor 14 for flow communication therebetween. Each secondary bioreactor 40, 41 includes a plurality of interconnected chambers 46 which house media 48 which is of essentially the same construction as media 38 located in primary bioreactor 14. Secondary bioreactor 40 is connected in flow communication (arrow 60) with primary bioreactor 14 through outlet 30, and secondary bioreactors 40, 41 are connected in series as shown by outlets 50, 52. The actual number of secondary bioreactors used will vary depending upon the condition of the water to be treated, safety factors desired and total retention time of water in the apparatus 10.

The bacteria selected for introduction into primary bioreactor 14 is preferably a commercial grade bacteria or a bacteria found in waste water treatment plants which is capable of degrading petroleum products. The bacteria may be introduced in either solid form or dispersed in a liquid as desired. The bacteria serve to decompose or degrade hydrocarbon-based petroleum products dispersed in water to their base compounds, namely carbon dioxide gas and water. Bioreactor 14 may include a device (not shown) to collect generated carbon dioxide gas and reintroduce it back into lower collection chamber 24. Alternatively, bioreactor 14 may be used in a greenhouse environment (not shown) where generated $CO_2$ would be used to nourish various forms of plant life.

If apparatus 10 is used to control VOC's in contaminated water, bacteria will be introduced into bioreactor 14 which are capable of degrading the particular VOC's identified as present. Some of the bacteria generated during use of apparatus 10, can be harvested, and may also be useful in serving to degrade petroleum products and/or VOC's in future uses, such as soil or ground-water remediation, treatment of hazardous waste or debris, etc.

Apparatus 10 is operated to degrade contaminated water as follows. With media 38 positioned as described in upper primary reaction chamber 22, bacteria is introduced into bioreactor 14 and any nutrients and/or oxygen flowed into the lower collection chamber 24 or separation chamber 28. Contaminated water is either introduced into separation chamber 28 at a constant predetermined rate, or in selective batches. The introduction may be accomplished by mechanical pumping or by gravity flow. In special cases, the introduction rate may vary dependant on the concentration of contaminants, as for example, when the water contains only a small amount of contaminants.

The rate can be increased if the contaminated water has any suspended solids, these will usually fall to the bottom of separation chamber 28. Drain 36 is periodically checked for the presence of solids, which are removed periodically. During retention time in the chamber, petroleum hydrocarbons absorbed by solids will be degraded by bacteria.

As the contaminated water continues to flow into separation chamber 28, the water column moves upwardly by displacement and eventually flows across media 38 in upper primary reaction chamber 22. As the water flows across media 38, bacteria growing on the media contact petroleum in the water and degrade the petroleum as described above.

By introducing the contaminated water into separation chamber 28, several advantages are realized. First, removal and degradation of solids is easily accomplished without the necessity of running the contaminated water through a filtration system which often results in down time due to filter clogs and maintenance requirements.

Second, maintenance of equilibrium between the water and free product in separation chamber 28 ensures that no free petroleum products reach the top of the fluid column. Since the bacteria effectively degrade all or at least a large portion of the contaminants (which are usually less dense than water) this significantly reduces the risk of fire or explosion.

Third, by constantly providing only one "food source" for the bacteria, constant growth and hybridization of the bacteria is achieved. Other systems used today, which introduce the water and/or nutrients at the top of the bioreactor, then pump this "food" through the bioreactor, often achieve inconsistent growth and even loss of bacteria. The bacteria generated can be collected and sold commercially.

Finally, the water which exits the system is generally rich in nitrogen content and may be particularly useful as a plant fertilizer and also contain large populations of bacteria which can be used in other biotreatment applications.

When the water column reaches the top of the primary bioreactor 14, it flows by gravity through outlet 30 and into secondary bioreactor 40. From here the water flows through media 48 for further treatment (if required) as described above, following the path shown by arrows 60. If no secondary bioreactors 40–41 are needed, outlet 30 directs the water to a collection tank 62.

The following hypothetical example illustrates the principles of the method and apparatus 10 of this invention as applied to a specific type of waste water.

EXAMPLE

Free petroleum product containing Benzene, solids which have absorbed Benzene and Benzene-contaminated waste water will be injected into the separation chamber. The solubility of Benzene is about 1.8 grams per liter of water. The primary chamber is packed with plastic culture media on which Benzene specific bacteria [free swimmers] are growing.

As free petroleum product, solids and the contaminated water is introduced into the separation chamber, Benzene which may have been present in the waste stream slowly dissolves in the water until equilibrium is reached. Benzene contaminated solids present in the waste stream fall by gravity to the bottom of the chamber and will add to the Benzene which becomes soluble in the water.

As Benzene leaves the inner chamber the contaminated water travels upwardly traveling across the bacteria-laden media and the Benzene is degraded. As Benzene leaves inner separation chamber, more free Benzene is dissolved in the water in the inner separation chamber, to maintain equilibrium. As the water stream reaches the upper level of the primary chamber, only water and some residual dissolved Benzene, which may have escaped the bacteria remain in the stream. The waste stream flows into the second and subsequent (if necessary) bioreactors where the rest of the Benzene is destroyed by similar bacteria.

After exiting the system, the waste water is highly laden with nitrogen and may be useful as a plant fertilizer. After treatment of all of the water from the waste stream, bacteria may be collected for use in future operations of Benzene degrading. Tests are generally run on the water stream as it exits the system to insure efficiency. If the Benzene concentration is not below acceptable limits, then the water is returned to the system for further treatment.

It is understood that the apparatus and method of this invention can be adapted to treat almost any common water pollutant. The above example and description are advanced only to illustrate the principles of the invention and the best mode of practicing them. The scope of the invention is defined in the following claims.

I claim:

1. A method for providing a food source to bacteria growing in a bioreactor, the method comprising the steps of:
   introducing the food source in the form of a free contaminant into a portion of a separation chamber arranged upstream of the bioreactor;
   dissolving an amount of said free contaminant into water which fills a remaining portion of the separation chamber to form a contaminated water stream; and
   flowing said contaminated water stream through the bioreactor to provide a consistent concentration of food source for the bacteria.

2. A method according to claim 1, further comprising the step of maintaining an equilibrium between said free contaminant and water in the separation chamber.

3. A method according to claim 1, further comprising the step of:
   hybridizing the bacteria in the bioreactor by constantly providing a single food source into the separation chamber.

4. A method according to claim 3, further comprising the step of harvesting the hybridized bacteria from the bioreactor.

5. A method according to claim 4, further comprising the step of using the harvested bacteria in other situations to degrade food sources similar to the single food source introduced into the separation chamber.

6. A method according to claim 5, wherein said other situations include at least one of soil remediation, ground water remediation, and hazardous waste treatment.

7. A method according to claim 1, further comprising the step of introducing oxygen into said contaminated water stream in the bioreactor to promote growth of the bacteria.

8. A method according to claim 1, further comprising the step of selectively introducing bacteria into said bioreactor which are capable of degrading the free contaminant.

9. A method according to claim 1, further comprising the step of preventing free contaminant from reaching a top area of the bioreactor to reduce risk of fires or explosions.

10. A method according to claim 9, wherein said preventing step includes the step of arranging the separation chamber in a tank of the bioreactor so as to be immersed in said contaminated water.

11. A method according to 1, further comprising the step of:
    monitoring the free contaminant in the separation chamber to ensure no free contaminant flows out of the bottom of the separation chamber.

12. A method according to claim 1, wherein said water contains contaminants apart from the introduced free contaminant.

13. A method for growing bacteria in a bioreactor, the method comprising the steps of:
    introducing a food source as a free product into a portion of a separation chamber arranged upstream of the bioreactor;
    dissolving an amount of said free product in water filling a remaining portion of the separation chamber until an equilibrium is reached at an interface of the free product and the water in order to form a contaminated water stream; and
    flowing said contaminated water stream through the bioreactor to provide a consistent concentration of food source for growing the bacteria.

14. A method according to claim 13, wherein said water contains contaminants separate from the free product introduced as the food source.

15. A method according to claim 13, further comprising the step of hybridizing the bacteria using the consistent food source.

* * * * *